United States Patent [19]

Fridley et al.

[11] 4,326,570

[45] Apr. 27, 1982

[54] TREE PLANTATION SELECTIVE FALLING AND STOCKING CONTROL DEVICE

[75] Inventors: Robert B. Fridley, Federal Way, Wash.; Raymond L. Moser, Hot Springs, Ark.

[73] Assignee: Weyerhaeuser Company, Tacoma, Wash.

[21] Appl. No.: 73,975

[22] Filed: Sep. 10, 1979

[51] Int. Cl.³ .............................................. A01G 23/08
[52] U.S. Cl. .................................. 144/34 R; 30/379.5; 83/928; 56/10.4; 144/309 AC
[58] Field of Search ................. 172/5; 83/928; 30/379, 30/379.5; 144/3 D, 34 R, 34 A, 34 E, 309 AC; 56/10.4

[56] References Cited

U.S. PATENT DOCUMENTS

| | | | |
|---|---|---|---|
| 2,580,110 | 12/1951 | Mabry | 83/928 |
| 2,662,561 | 12/1953 | Duncan, Jr. | 30/379 |
| 2,664,119 | 12/1953 | Spearman | 83/928 |
| 3,115,739 | 12/1963 | Thoen et al. | 56/10.4 |
| 3,369,612 | 2/1968 | Laikam | 172/5 |
| 3,526,083 | 9/1970 | Barry et al. | 56/10.4 |
| 3,604,479 | 9/1971 | Jordan | 30/379.5 |
| 3,665,685 | 5/1972 | Allard | 56/10.4 |
| 3,913,681 | 10/1975 | Lincoln et al. | 172/5 |
| 3,959,925 | 6/1976 | Sanders | 30/379 X |
| 4,104,851 | 8/1978 | Perry | 56/10.4 |

FOREIGN PATENT DOCUMENTS 444525  11/1974  U.S.S.R. ........................ 144/34 R

OTHER PUBLICATIONS

Kerruish, CM 1976, Thinning techniques applicable to *Pinus radiata plantations* New Zealand Journal of For. Sci. 6:201-202.

Trackmac Slash Disposer, Technical Release 75-R-53, American Pulpwood Association, Washington, D. C. (1975).

Marwald's Perfect Rotary Mowers, Marwalds, Ltd. Burlington, Ontario (N.D.).

The Cultimatic Humus, Tradewinds, Inc. Tacoma, WA.

*Primary Examiner*—W. D. Bray
*Attorney, Agent, or Firm*—Weyerhaeuser Company

[57] ABSTRACT

The application discloses an apparatus and method for selectively cutting trees on plantations, such as might be done for thinning or stocking control. The apparatus may be drawn by a wheeled or tracked prime mover. It comprises an outwardly biasable primary arm mounted on a supporting frame. The distal end of this arm bears a guide means that serves to assist in moving it past those trees that are not to be removed in a manner that prevents injury to the tree. The guide means also acts as a guard for a tree-severing means. When a tree is to be removed the severing means is moved forward in the direction of travel so that it contacts the tree before the guide means. Otherwise, the severing means is prevented from contacting the tree by the guide means. The severing means may be manually deployed or it can be controlled by a simple logic system into which travel speed and take/leave decisions are made. The device is normally used in plantations in which trees have been planted in approximate rows. It can accommodate trees that are reasonably off the row axis without the need for steering the prime mover from a predetermined line of travel.

59 Claims, 14 Drawing Figures

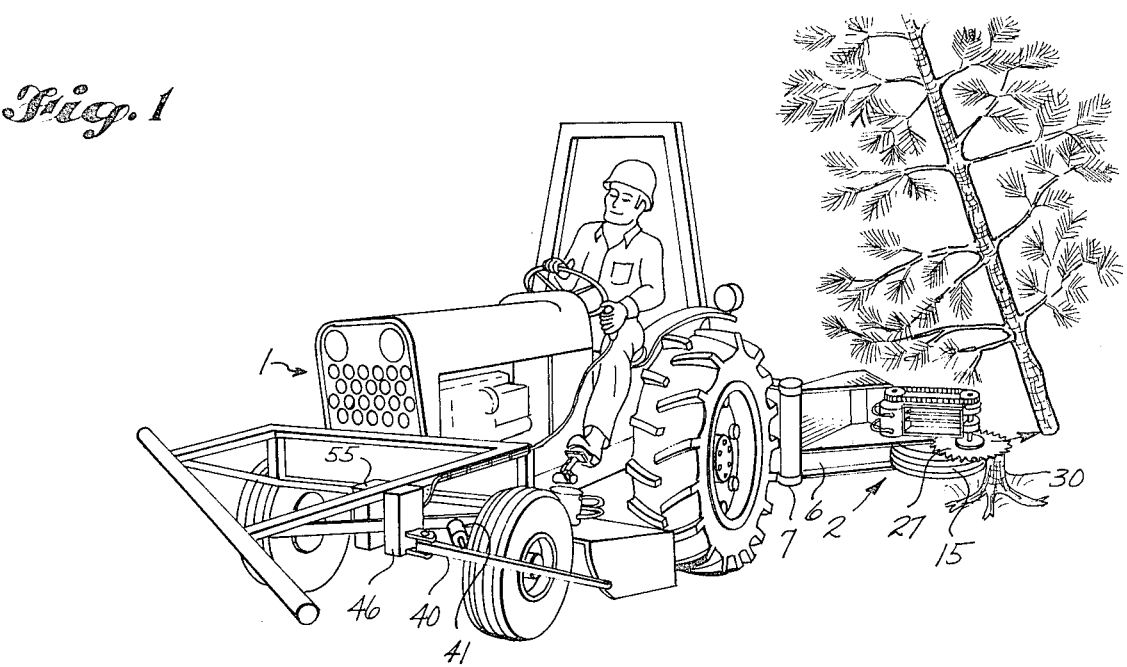
Fig. 1
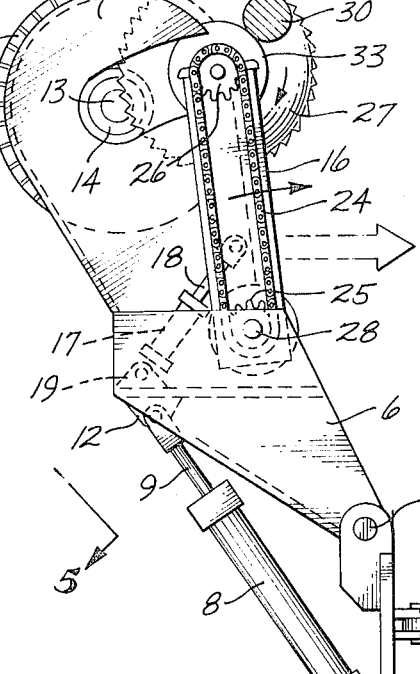
Fig. 3
Fig. 4

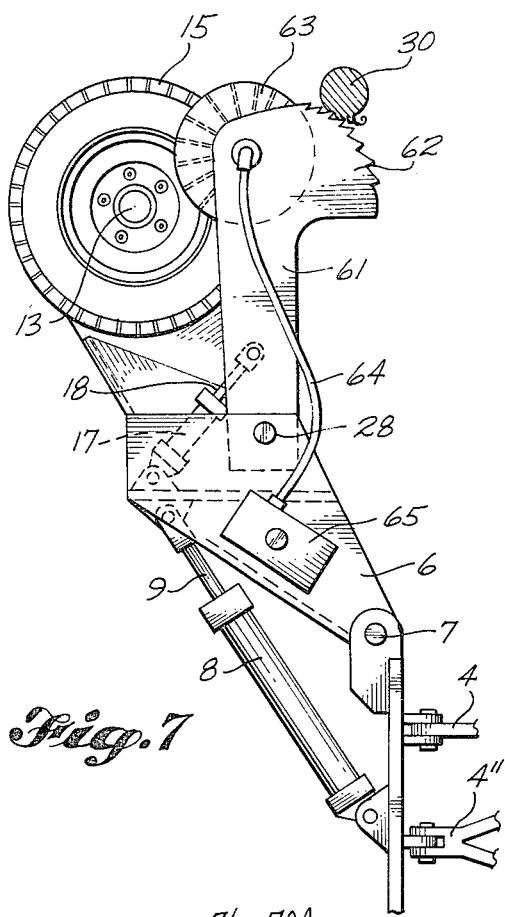
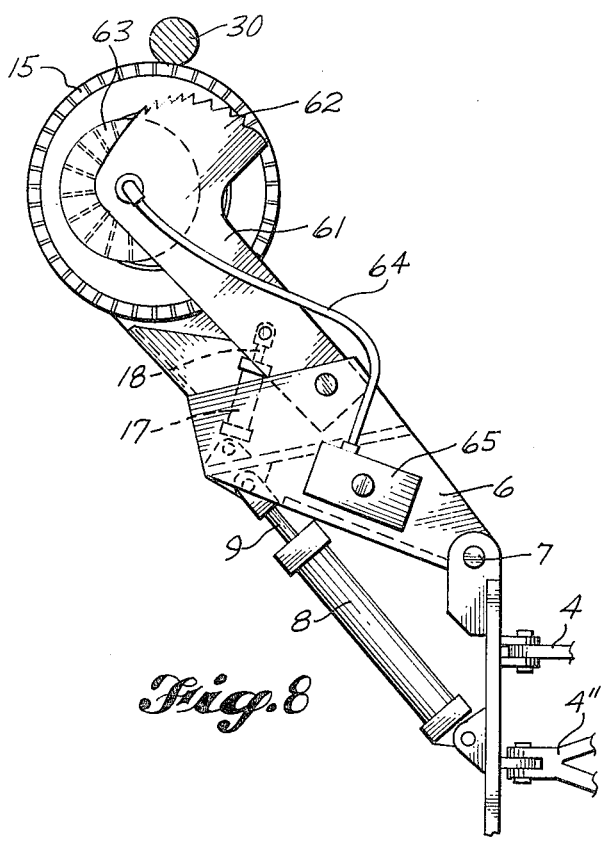
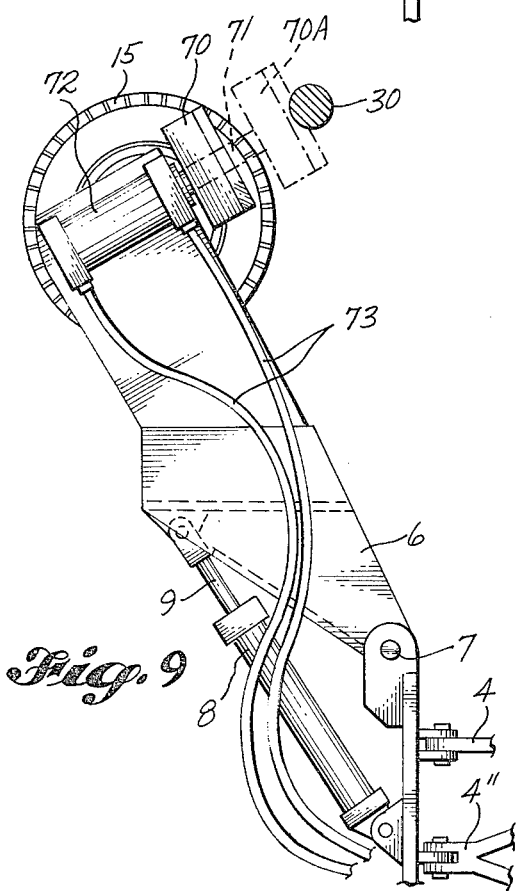

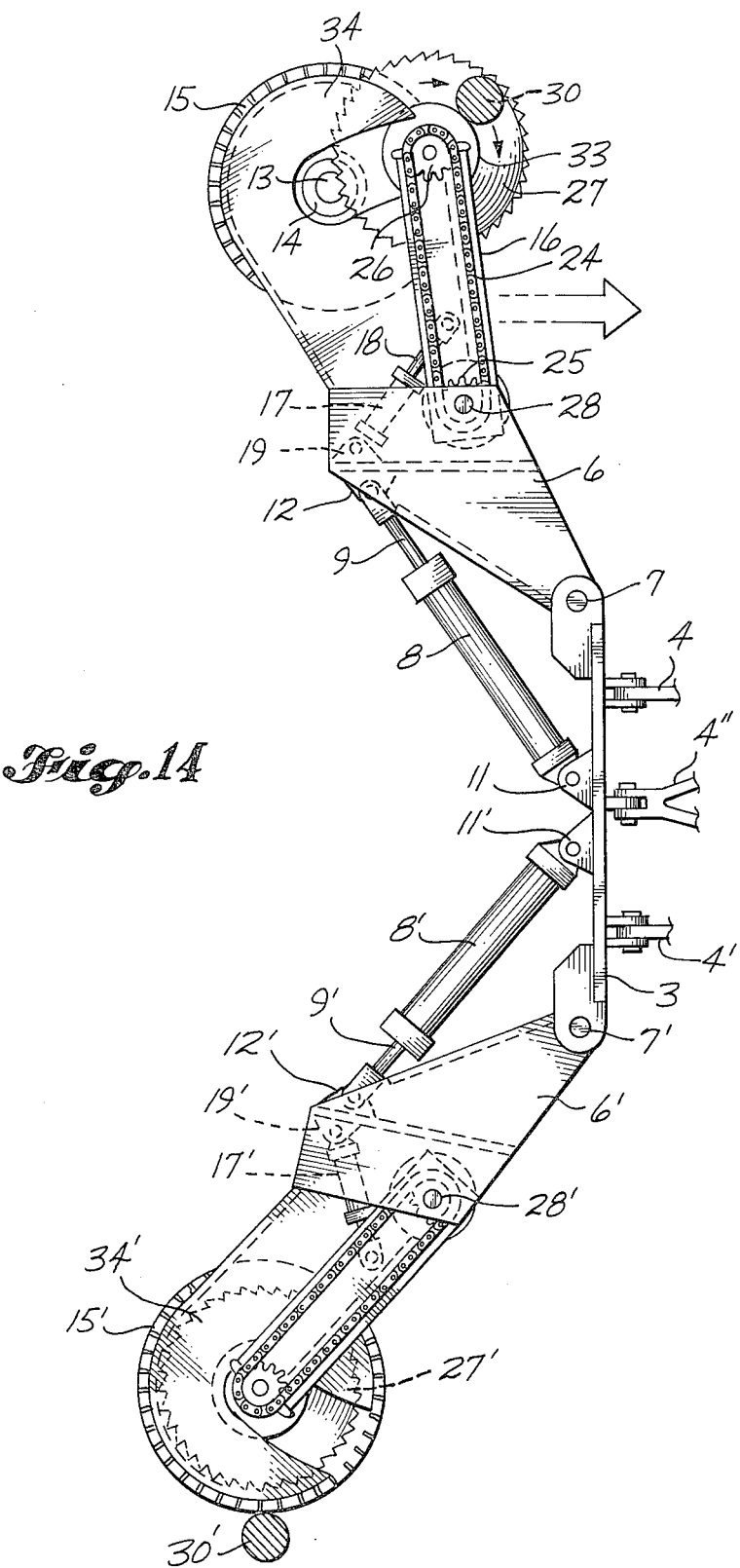

TREE PLANTATION SELECTIVE FALLING AND STOCKING CONTROL DEVICE

BACKGROUND OF THE INVENTION

The present invention is a semi-automated device for thinning young tree plantations to achieve proper stocking levels or for selectively falling larger trees during thinning or final harvesting operations.

The heavy need for lumber, pulp and other forest products has led to entirely new ideas of forest management in the last three decades. In this time the timber industry has turned from a log supply harvested from wild forests to a current practice of intensively managed tree plantations. A typical crop cycle may vary between 25 and 100 years, depending on many factors. Among these are tree species, soil productivity and climate. The economic benefits of keeping this crop cycle as short as possible are fully obvious. To further this end, forest managers have turned to such practices as the planting of genetically improved seedlings, fertilization at one or more times during the growth cycle and periodic thinning of the crop as the trees grow larger and begin to compete for space and nutrients.

Silvicultural practices vary between different areas of the country because of terrain, climate and tree species variation. in the southeastern United States and in other parts of the world where the terrain is of flat to moderate relief, much more mechanization is possible than in more mountainous forest areas. In many southern pine areas trees can be planted in relatively straight, parallel rows with the assistance of tractor-drawn equipment. These stands are inherently more tractable for mechanized silvicultural practices than are randomly planted stands.

Cutover land is normally restocked with seedlings at much higher densities than is desirable in the final years before harvest. There are a number of reasons for this. Mortality is often high in the early years and overstocking is one way to accommodate this problem. Tree form is also improved when stands are somewhat more crowded in their earlier years because the tendency to develop heavy lower limbs is reduced. Overstocking also provides some natural control of competitive trees and brush in the early years of the stand.

It is common practice to restock plantations at levels of 1500 to 2500 seedlings per hectare. In the southern pine area this is frequently done using a row spacing of approximately three meters with seedlings every one to two meters along each row. By the time the plantation is six to eight years old the trees will be four to seven meters tall and have a lower stem diameter about 7 to 15 cm. At this time a precommercial thinning is usually made to reduce stocking level to about 1000 trees per hectare. By precommercial is meant that the cut trees are usually not brought out of the woods but are allowed to remain and decay. As the value of forest biomass for fuel increases it may be economical to collect these trees but this is not presently the case due to their very small size. Subsequent thinnings, when the removed stems are commercially utilized, typically reduce the stocking level to about 370 trees per hectare by 20 to 30 years of age. This level is maintained until the entire stand is ultimately harvested and the land again made ready for a new crop.

At the present, virtually all precommercial thinning is done manually by crews using chainsaws. This is slow, difficult and sometimes hazardous work. A trained cutter may be able to thin from 0.4 to 1.2 hectares per man in an eight-hour day, this variability being largely a factor of brush density on the site.

Few prior attempts have been made to mechanize this job. One example in U.S. Pat. No. 2,580,110, which shows a tractor-mounted saw could, by a far stretch of the imagination, conceivably be adopted for stocking control although the embodiment shown is apparently intended for bucking cord wood. A more practical machine for stocking control is a tractor with a saw mounted on a swinging boom that is apparently hydraulically activated, as shown in the article by C. M. Kerruish, Thinning Techniques Applicable to *Pinus Radiata* Plantations, *New Zealand Journal of Forest Science,* 6 (2), 201–2 (1976).

Other much heavier machines primarily intended for site preparation have also been considered for stocking control. One such machine is the Trakmac, made by Washington Iron Works, Seattle, Wash. This consists of an articulated double-tracked prime mover with a swinging boom in the front that carries a large and very rugged inertia cutter. In general, this and other machines are too heavy, too expensive and require a very high degree of operator skill to avoid damage to trees selected to remain standing.

Any mechanized stocking control equipment has two difficult problems to accommodate. The trees are only rarely found growing in exactly straight rows. Variations of 20 to 30 cm either side of the row axis are common even with machine-planted trees. These variations are usually even greater when the plantations have been hand planted. A second problem is that of debris on the ground, such as rocks and old stumps, that would cause a tractor driver to take a somewhat zig-zag course rather than one exactly parallel to the tree row. There are thus two error zones that must be accommodated; one around the tree row axis and another around the preferred line of tractor travel. Because of this, with a simple boom-mounted saw, such as the one shown by Kerruish, the tractor driver is going to spend a high proportion of his time steering the tractor into a position where he can cut the individual trees to be removed. This greatly slows the operation to the point where a machine of this type is only marginally advantageous, at best, over ground crews using chainsaws.

SUMMARY OF THE INVENTION

The present invention is directed to an apparatus and method for selectively removing trees on plantations, such as might be done to achieve stocking control, for thinning, or for final harvest. It comprises an improved selective severing device which can accommodate trees that are reasonably displaced from the row axis with little or no steering of the prime mover from a predetermined line of travel parallel to the row. The equipment is also tolerant of normal deviations in this line of travel caused by obstacles which must be avoided by a driver/operator.

These results are accomplished by mounting an outwardly biasable primary arm on a supporting frame which is, in turn, coupled to a prime mover. During operation, this arm is normally oriented generally transverse to the line of travel so that its distal end normally extends some distance beyond the axis of the row of trees being thinned. A guide means at the distal end of the primary arm contacts the trees and serves to assist in moving the arm past those trees which are not to be removed in a manner that prevents injury to the tree. In this part of the operation the arm is moved far enough back against its biasing force so as to clear the tree.

The guide means also acts as a guard for a severing means. When the tree encountered by the guide means is not to be removed, it is protected from contact with the severing means by the guide means.

The severing means is mounted near the distal end of the primary arm. When a tree is to be removed, the severing means is moved generally forward, in the direction of travel, exposing the severing means so as to cut the tree. For stocking control, trees to be removed by this operation will not greatly exceed 15 cm in diameter at the point of severing. The machine can be modified very simply to accommodate much larger trees, however.

The severing means can be selectively deployed on a direct signal from the operator. It many be alternatively controlled by a logic system into which the operator makes inputs during a predetermined time window as he approaches a given tree. Tree location and travel speed inputs may also be made to the logic system. In one version of the equipment, the operator would enter an ordinal tree grade, rather than a take-or-leave decision. Optimum tree selection would then be made by the logic system.

It is thus an object of this invention to provide a tractor-propelled selective falling apparatus that is relatively light weight, simple, inexpensive and efficient in operation.

It is also an object to provide a selective falling apparatus that can accommodate reasonable off-axis spacing of trees in a plantation stand without the need for steering the tractor into position to sever each tree that is to be removed.

It is a further object to provide a selective falling apparatus under control of a single operator/driver whose vision is concentrated primarily in the direction of travel.

These and other objects and the construction and operation of the equipment will be made clear after reference to the following drawings and description in which:

FIG. 1 is an overall isometric view of one way in which the selective falling equipment might be mounted and used with a light tractor as the prime mover.

FIG. 3 is a plan view showing the selective falling device as it contacts and rides past a tree that will remain in the stand.

FIG. 4 is a similar plan view of the selective falling device with the severing means deployed to remove a tree.

FIG. 7 is a plan view showing a variation primarily used for stocking control in which the tree is not severed by in which a wound is induced through the bark and a tree toxicant applied to the wound.

FIG. 8 is a similar plan view in which the tree wounding device is retracted to a guarded position.

FIG. 9 is a plan view of a further variation in which a severing knife translates forward to remove a tree.

Figure 11:
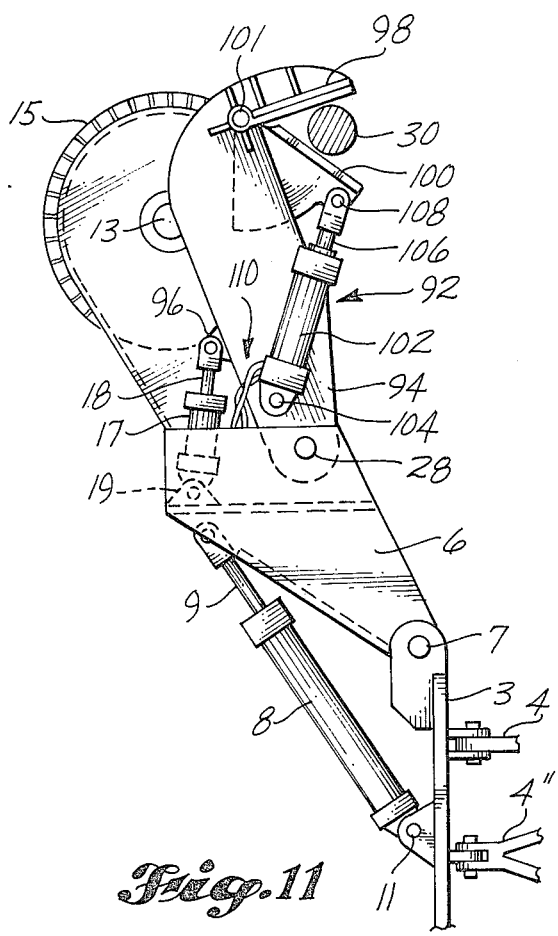

FIG. 11 a similar plan view of the selective falling device in which the severing means is a deployable shear.

Figure 12:
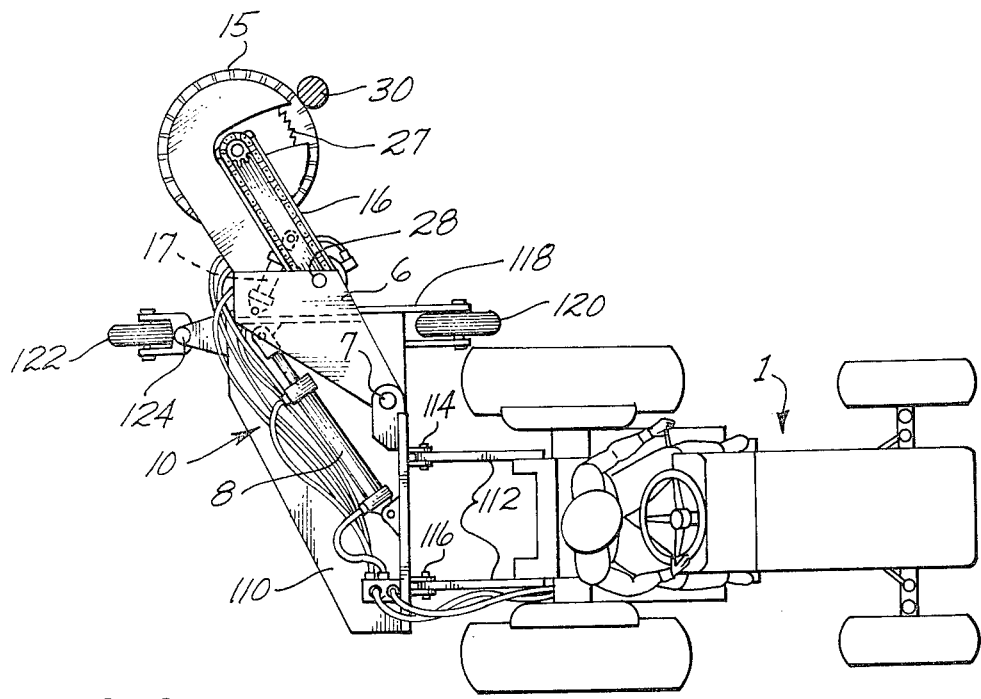

FIG. 12 is an overhead view of the tractor and selective falling equipment in which the apparatus is attached by a semi-mount.

Figure 13:
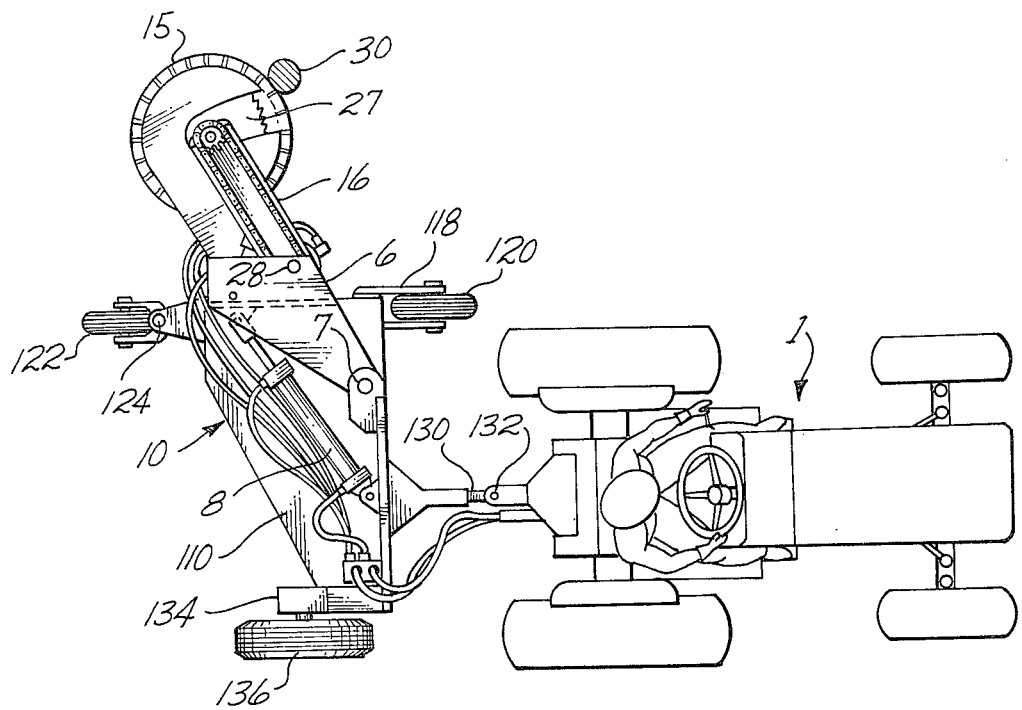

FIG. 13 is a similar overhead view of the tractor and selective falling equipment in which the equipment is towed by the tractor.

FIG. 14 is a plan view of the selective falling device in which mirror image devices are used, one on either side of the tractor.

DETAILED DESCRIPTION OF THE PREFERRED EMBODIMENTS

For convenience, this will be described in the context of a stocking control application although it must be understood that its usefulness is not so limited.

Figure 2:
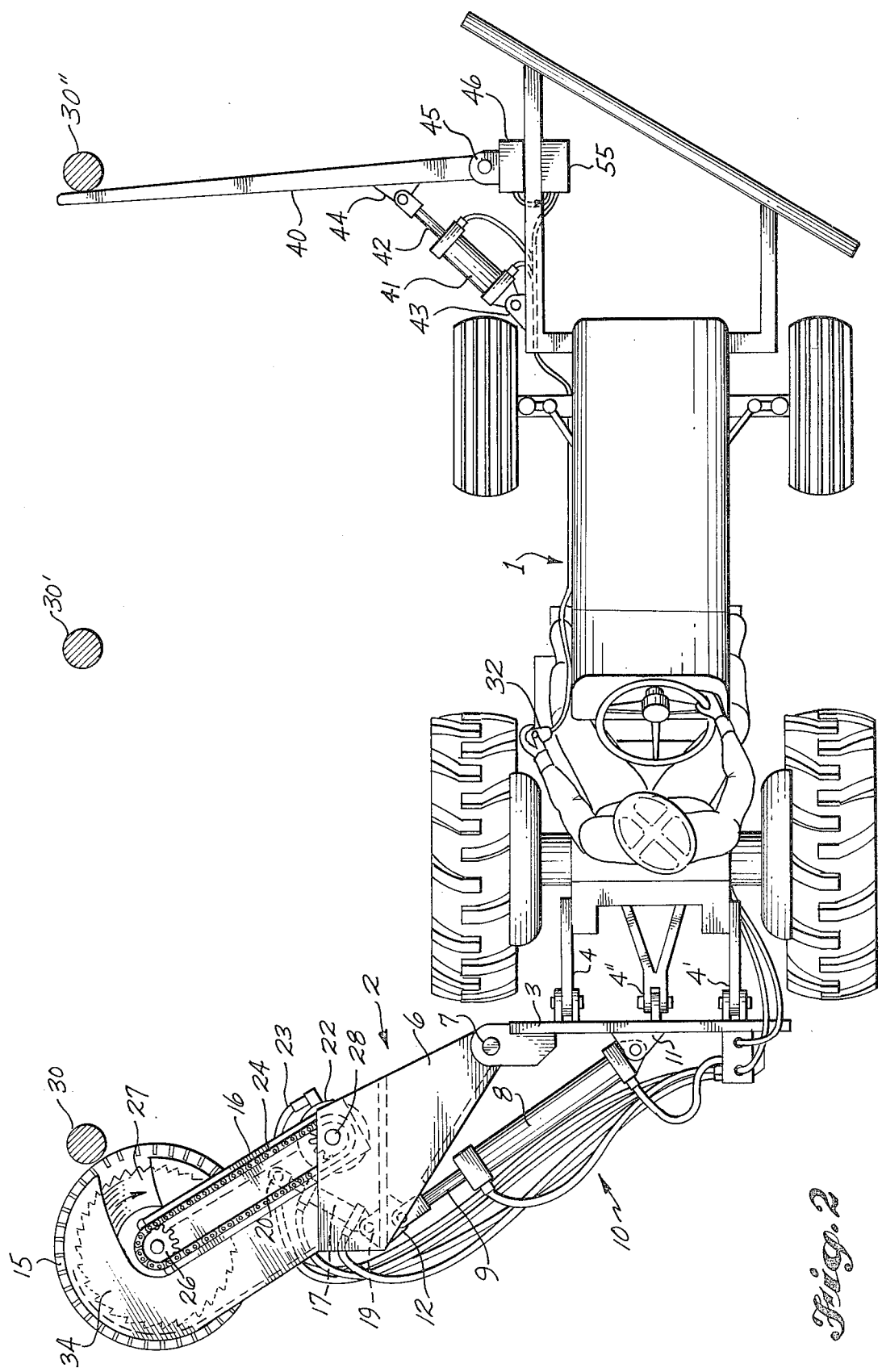
FIG. 2 is an overhead view to larger scale of the tractor and selective falling equipment.

Referring now to FIGS. 1 and 2, the prime mover can be a standard light agricultural tractor, generally shown at 1. A stocking control device 2 is mounted on a rigid framework 3 which is tied to the tractor by a conventional three-point hitch 4, 4' and 4''. If desired, the rigid mount at 4'' may be made adjustable for leveling or it may be replaced by a hydraulic cylinder to tilt the mechanism up from the ground while traveling to and from an operating site. It is equally acceptable to use a semi-mount or a towed mount for the stocking control device. In fact, when a tracked prime mover is used either of these mounts may be preferred to the more rigid mounting provided by the three-point hitch. In the semi-mount, there are only two points of attachment to the prime mover and much of the weight of the device is supported by one or more wheels. The towed mount is tied to the prime mover at a single attachment point and a plurality of wheels are necessary for stability.

A primary support arm 6 is swingably attached to the mounting frame by pivot pin 7. Hydraulic cylinder 8 operates between frame 3 and primary support arm 6 to control position of the support arm. Cylinder 8 is pinned to the support frame by clevis arrangement 11 and to the primary arm by similar arrangement 12. Hydraulic fluid is supplied by a cluster of lines generally indicated at 10. When oil is supplied to the proximal end of cylinder 8, piston rod 9 is forced outward thus swinging the primary arm from an idling position, roughly parallel to the longitudinal axis of the tractor, to an operating position in which it is approximately transversely located.

Figure 6:
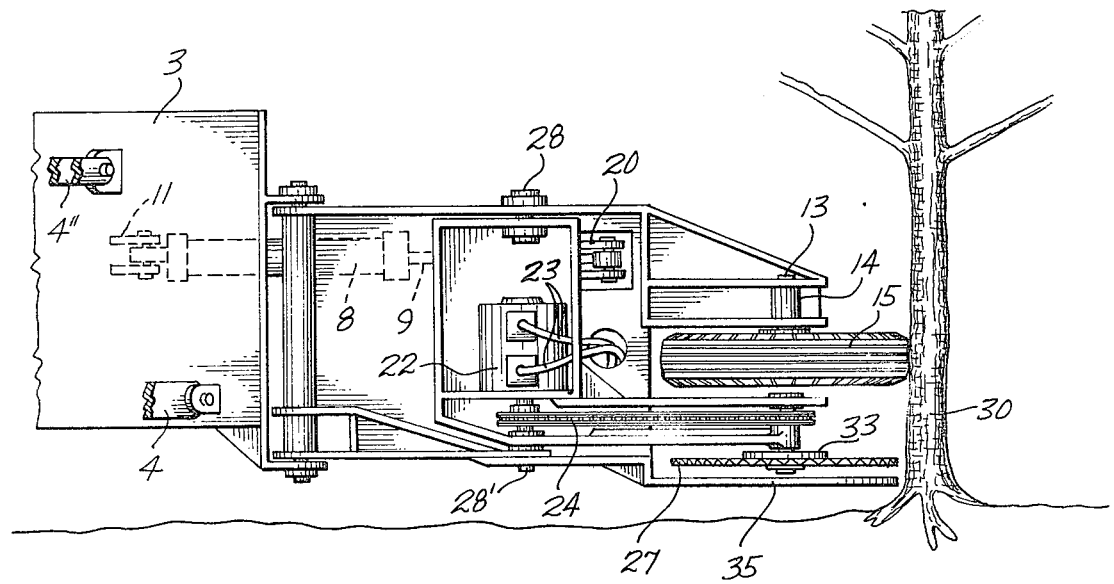
FIG. 6 is a similar elevation view of a construction variation in which the severing device operates closer to ground level.

The primary arm terminates at its distal end in guide means 15. In the illustration shown this is simply a mounted vehicle tire which is attached to axle 13 housed in guide wheel bearing 14 (FIGS. 4 and 6). As will be explained later, the guide means serves a double function; it acts to guard the severing means and helps to guide the primary arm around trees which are not to be removed in a manner so that bark injury does not occur.

Figure 5:
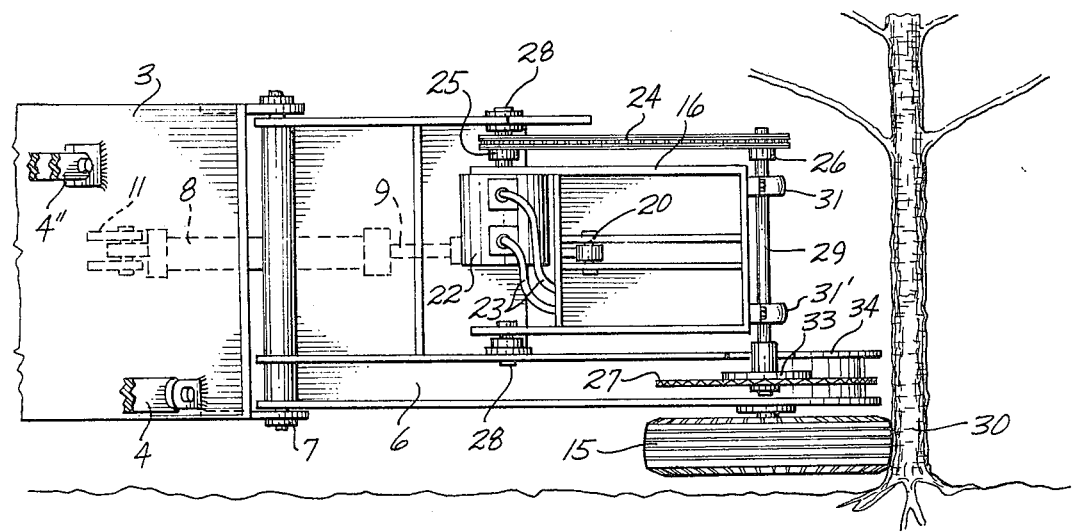
FIG. 5 is an elevation view of the selective falling device as it rides past a tree that will remain in the stand.

Secondary arm 16 is swingably mounted on primary arm 6 by pivot pins 28, 28' (FIGS. 5 and 6). Its position is controlled by a deploying means which consists of hydraulic cylinder 17 mounted between the primary arm and the secondary arm. Cylinder 17 is attached to the primary arm by clevis arrangement 19 and to the secondary arm by similar arrangement 20. When oil is supplied to the proximal end of cylinder 17, the secondary arm 16 is swung forward of the primary arm. Opposite motion occurs, of course, when oil under pressure is supplied to the other end of the hydraulic cylinder. Located at the distal end of secondary arm 16 is severing means 27 which, in the example shown, is a circular saw. It should be understood that other conventional means of severing would be equally appropriate. These might include a chainsaw, hydraulically operated shear, or fixed blade. The only requirement is that when in its inactive position, trees must be protected from the severing means by guide means 15. In the example shown, circular saw 27 is mounted in collar 33 which, in turn, is affixed to drive shaft 29. The drive shaft is mounted at the distal end of secondary arm 16 in pillow blocks, or equivalent bearings 31, 31'. It is driven by hydraulic motor 22 to which oil is supplied through lines 23. Drive sprocket 25 is connected through chain 24 to driven sprocket 26 which, in turn, is affixed to drive shaft 29 in order to drive the severing means.

When a circular saw is used it is advantageous to have a heavy collar to supply inertia energy to the blade during a cut. While not critical, a rule of thumb might be to use a collar about half the diameter of the blade. As one example, with a saw blade 55 cm in diameter, a collar about 25 cm in diameter and totaling 5.1 cm in thickness has worked very well.

The driver/operator has at his command conrol means 32. In the simplest form of the invention as the tractor is driven down the row, the driver makes a decision whether a tree is to be removed or left standing. In the former case, when the tree is to be taken out, the driver activates the appropriate switch on control means 32 and the severing means is deployed in order to remove the tree.

The operation of the equipment when a tree is allowed to remain or is removed is best seen by referring to FIGS. 3 and 4. In FIG. 3 the guide means would normally be in position A when tree 30A is first contacted. This tree is not to be removed. Pressure of the tree acting against the guide means and, in turn, against the biasing force of hydraulic cylinder 8, forces the primary arm backward as the prime mover advances along the row. When the angle between the primary arm and the row axis has decreased sufficiently so that the guide means is now moved to position B, the guide means will roll past tree 30 without causing injury. As soon as it has passed the tree, the biasing force exerted by cylinder 8 will move the primary arm back to its original position. The original and bypass positions of the leading edge of the primary arm are designated by symbols A' and B' on FIG. 3.

In the alternative situation, illustrated in FIG. 4, when it is desired to remove a tree, cylinder 17, acting through piston rod 18, moves the secondary arm to a forward position where the severing means is exposed. In this case, tree 30 is first contacted by the severing means rather than the guide means and is thus cut off. This situation is perhaps best represented in FIG. 1.

In the example shown, guide means 15 is approximately 70 cm in diameter and circular saw 27 is about 55 cm in diameter. Along with the capability of varying the position of the primary arm, this gives an approximate allowance of ±45 cm displacement from the planting axis in which trees can be removed without having to steer the tractor in relationship to the row axis. Obviously, other simple mechanical arrangements can be made to increase this range of tolerance.

The alternative shown in FIG. 6 is an arrangement that may be used where it is desirable to sever trees somewhat closer to the ground line. This situation could prevail where some economic use could be made of the severed trees. One such use might be the collection of waste biomass for fuel. The arrangement shown in FIG. 6 can easily sever the tree 30 cm closer to the ground line than the alternative shown in FIG. 5. Surprisingly, in the class of trees that would normally be managed by equipment of this type; i.e., in the neighborhood of 10 cm diameter, this additional 30 cm of stem can represent up to 8 percent of the above-ground biomass.

In the arrangement shown in FIG. 6 guard plate 35 is disposed beneath the severing means to protect it from ground-level obstacles when in the retracted position. This would normally be a heavy steel plate which would serve to guide the stocking control assembly over such obstacles as rocks or low stumps. In the arrangement shown in FIG. 5, guard plate 34 is disposed above the severing means. In this case, it primarily serves the purpose of personnel protection.

The stocking control device may be advantageously employed in either of two modes of operation. The one chosen will normally depend upon the individual circumstances. Ordinarily, the equipment would be operated with the severing means normally guarded. In some situations it may be desirable to operate with the severing means normally exposed, very brushy sites could be one example. Here not only is the primary result of stocking control achieved, but significant removal of competing brush can also be made.

Depending on stocking density, from one to three trees out of every five will be removed during precommercial thinning. When a smaller percentage of the stand is being removed it may be more advantageous to operate with the cutter in a normally guarded mode. This way a smaller number of operations are required of the driver who must activate the cutter only when he wishes to take out a tree. Conversely when a high percentage of the stand is being removed it may be simpler for the operator to have the cutter normally exposed. In either case the cutter may be deployed for brush removal.

On some occasions, as when it is desirable to avoid excessive brush on the ground, it may be preferred to simply kill the tree but allow it to remain standing rather than sever it. A version of the stocking control device that will accomplish this is shown in FIGS. 7 and 8. Here the severing means is replaced by a modified secondary arm 61 containing a tree wound-inducing means 62 at its distal end. This is normally a toothed bar that will remove or cut through a strip of bark near the base of the tree. The wound-inducing means 62 is followed by an applicator means 63, in this case a sponge roller, that applies a herbicidal toxicant to the wound area. The toxicant is supplied to applicator 63 through a supply line 64 served by a pump 65. The pump communicates with a source of liquid toxicant, not shown. When the operator wishes to leave a tree, the secondary arm is allowed to remain in its normally retracted position, as shown in FIG. 8, where the wound-inducing means and toxicant applicator are guarded by guide means 15.

It is not essential for the tree severing means to be mounted on a pivoted secondary arm. It is quite permissable for the severing means to translate forward from the primary arm rather than swing forward. An example of such a modification is shown in FIG. 9. Here, for sake of clarity, a fixed blade 70 is shown as the tree severing means. This is shown mounted at the distal end of piston rod 71 of hydraulic cylinder 72 which is supplied by oil through lines 73. When in the safe position, the cutter 70 is guarded from contact with a tree by guide means 15. If it is desired to remove a tree, oil is supplied to cylinder 72 to move the cutter forward of the guide means as is shown at 70A. In this position it is driven into a tree 30 by the forward force of the prime mover. It should be evident that one skilled in the art could readily adapt any of the severing means described or illustrated to translate forward from a guarded position on the primary arm 6.

In some instances it may be desirable to impose additional biasing force on primary arm 6 to prevent excessive rearward movement during tree severing. An example might be when a fixed blade such as that shown in FIG. 9 was being used. This can be easily accomplished in any of a number of ways. Probably the simplest is the use of an auxiliary biasing cylinder in parallel with primary arm hydraulic cylinder 8. This could be activated by the same signal that placed the tree severing means into the severing position. It should also be evident that a separate biasing means could be used against the primary arm other than the means which moves it into the operating position.

Figure 10:
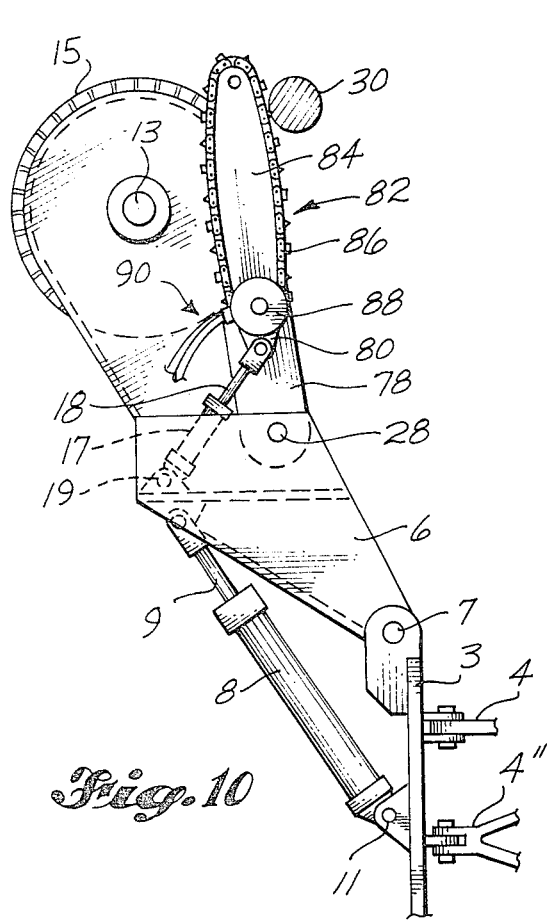
FIG. 10 is a plan view of the selective falling device employing a chain saw as the severing means.

Referring to FIG. 10, a variation of the selective falling apparatus is shown in which a chainsaw is utilized as a severing means. A modified secondary arm 78 is tied to the piston rod 18 of hydraulic cylinder 17 at eye 80. A chainsaw is generally indicated at 82 and consists of a bar 84, equipped with chain 86, and is driven by hydraulic motor 88. Hydraulic fluid is supplied to the motor through lines generally indicated at 90.

Another variation of the severing means is shown in FIG. 11. Here a heavy shear, generally indicated at 92, is utilized as a severing mechanism. In this case the secondary arm 94 also serves as the main portion of the shear. It is mounted on primary arm 6 at pivot point 28 and to the secondary arm hydraulic cylinder piston rod at eye 96. The shear consists of a fixed jaw 98 and a movable sharpened shearing blade 100, pivotally connected to the secondary arm at 101. The shear is operated by a hydraulic cylinder 102. This may be attached with post or stud on the secondary arm at 104. This piston rod 106 is attached by a clevis mounting to the blade 100 at 108. Cylinder 102 is supplied by hydraulic oil through lines generally indicated at 110. The operation of cylinder 102 may be under the manual control of the tractor operator or it may be operated by a sensor, not shown, which signals the presence of a tree within the jaws.

In some types of rough terrain it may be preferable for the selective falling equipment to have a more flexible mounting to the prime mover than is provided by a typical three-point hitch. Two such possibilities are as shown in FIGS. 12 and 13. FIG. 12 shows a semimount. The selective falling apparatus is mounted on a somewhat modified frame 110 to extension bars 112, which project back from the prime mover, at clevis mountings 114, 116. Frame 110 has on its upward side a wheel mounting arrangement 118 which bears wheel 120. In the embodiment shown a second swinging wheel 122 is mounted at the rear of frame element 110 at pivot point 124. It should be understood that other arrangements of supporting frame 110 will be fully apparent to those skilled in the art. FIG. 13 shows a fully towed selective falling apparatus. The frame 110 is modified by the addition of a tongue 130 which is tied to the prime mover at hitch 132. In this case the frame is further modified by adding a wheel mounting 134 at the inboard end that carries supporting wheel 136.

A trained operator can travel at a rate slightly exceeding 3 km/h or slightly over 50 m/min. In a tightly stocked stand where survival has been good he can pass as many as 35 trees every minute. These must be visually inspected, mentally graded, and a take/leave decision made. This rate of decision making is pushing the limits of capability of the operator, especially when he must also concentrate on driving the prime mover. The operator's capability may be considerably extended by adding a decision-executing and timing means so that he can concentrate primarily on driving and grading and does not have to keep glancing over his shoulder to make sure that he is removing the proper trees. In its simplest form this would comprise a logic means, housed in cover 55 into which the driver would simply enter a take/leave decision from control means 32. The other input into the logic means would be speed of travel. This way, the driver would have approximately a two-second time window in which to enter a decision about a tree a selected some distance ahead of his prime mover. The logic means would then cause the severing means to be deployed at the proper time to remove those trees which were to be taken out. A second and more sophisticated method might be for the operator to enter a visual tree quality grade into his control means. Grades would normally be on an ordinal scale and would be based on such factors as tree diameter, height, straightness and freedom from growth aberations. The logic means in this case can readily compute the optimum tree spacing from an algorithm contained in a memory component. This would be a very simple system since only three or four trees would need to be retained within the memory. p Another way in which the operator's burden of decision making can be eased is to have a sensing means which would automatically detect when a crop tree was being passed by the prime mover. Such a sensing means is shown on FIGS. 1 and 2. Referring particularly to FIG. 2, the sensing means can comprise a heavy bar 40 pivotally mounted to an extension of the tractor frame at 45. The sensing means would be biased in a forward position by any of a number of ways. In the illustrations shown a hydraulic cylinder 41 acting through piston rod 42 provides the biasing means. Cylinder 41 is attached to the tractor frame extension at its proximal end by clevis arrangement 43. The piston rod is likewise attached to the sensing bar by similar arrangement 44. Mounting box 46 serves not only to mount the sensing means to the frame, it also contains a transducer to indicate when a tree has been passed. In normal operation a fairly heavy biasing force would be exerted against sensor bar 40. This would be sufficient to crush down any heavy brush that might be encountered and perhaps even stunted crop trees up to 5 cm in diameter. Larger trees would simply deflect the sensor bar to the rear against the biasing force until sufficient deflection had occurred to permit clearance. When a young tree of the desired minimum size was encountered it would enter a signal into a logic means and this, in turn, would operate into the time base. A visual signal, such as an indicator light, could be displayed to the operator indicating that he needed to enter either a take/leave decision or a grade decision into control means 32. Other tree-sensing or indicating means, such as a prefocused light beam or laser distance detector, could obviously be chosen instead of the one shown.

In any of the above systems which are designed to decrease the decision-making burden on the operator a logic override system would typically be provided. It is obvious that many field situations could occur in which on-the-spot human judgment and control would give superior results.

It will be clear that many variations of the above stocking control device could be made which would be functionally equivalent. As one example, a second stocking control mechanism could be mounted on the prime mover which would be in mirror relationship to the other as seen in FIG. 14. In this way stocking control could be achieved on a double row of trees with one pass of a prime mover. Other variations will be readily apparent to those skilled in the art and it is intended that these be encompassed within and limited only by the scope of the appended claims.

What is claimed is:

1. Apparatus for selectively cutting trees on tree plantations, said apparatus being propelled by a prime mover and comprising:
   a. a rigid frame supporting an operating assembly which further comprises;
   b. a moveable arm pivotally mounted to the frame, said arm including;
      (1) positioning means to permit relative movement of the arm from an idling position relatively nearer the longitudinal axis of the prime mover to an operating position relatively outboard of the longitudinal axis,
      (2) biasing means exerting a forward force on the arm while in the operating position, and
      (3) guide means at the distal end of the arm to direct the arm past trees selected to remain standing by causing the arm to move back toward the idling position against the biasing means when such trees are contacted during forward movement of the prime mover;
   c. deployable tree-severing means mounted at the distal end of the arm; and
   d. deploying means operating between the arm and severing means, said deploying means serving to advance the severing means from a neutral position where said severing means is guarded by the guide means to a cutting position where the severing means is forward of the guide means and is exposed to sever trees selected for removal.

2. The apparatus of claim 1 where the guide means is a tired wheel rotatably mounted in the distal end of the arm.

3. The apparatus of claim 1 where the severing means is a circular saw.

4. The apparatus of claim 1 where the severing means is a chainsaw.

5. The apparatus of claims 3 or 4 further including motor drive means for said saws.

6. The apparatus of claims 1 or 2 where the severing means is a hydraulically operated shear.

7. The apparatus of claims 1 or 2 where the severing means is a fixed blade.

8. The apparatus of claim 1 where the severing means is enclosed within a guard when not deployed.

9. The apparatus of claim 1 where the severing means is mounted above the guide means.

10. The apparatus of claim 1 where the severing means is mounted below the guide means.

11. The apparatus of claim 10 further including additional guarding means for the severing means, said additional guarding means being located below the severing means and depending from the primary arm.

12. The apparatus of claims 1 or 2 wherein the frame is attached to the prime mover by a three-point hitch.

13. The apparatus of claims 1 or 2 wherein the frame is attached to the prime mover by a semi-hitch and the frame is further supported by a wheel or wheels.

14. The apparatus of claims 1 or 2 wherein the frame is towed by the prime mover and the frame is further supported by a plurality of wheels.

15. The apparatus of claim 1 wherein a second operating assembly is mounted in mirror relationship to the first for achieving simultaneous selective cutting on two rows of trees.

16. The apparatus of claim 1 wherein the severing means is moved to a severing position by operator control.

17. The apparatus of claim 1 including logic means for controlling the position of the tree severing means, said logic means receiving inputs of:
   a. an operator-entered take/leave decision relative to a subject tree; and
   b. a time base operating between the time at which such take/leave decision was entered and the time at which said operating mechanism would encounter the subject tree so that the severing means is exposed for a take decision when the subject tree is encountered and guarded when a leave decision has been made.

18. The apparatus of claims 16 or 17 in which the severing means is guarded by the guide means when in the normal operating mode, said severing means being deployed to the cutting position by control means responsive to operator or logic means inputs.

19. The apparatus of claims 16 or 17 in which the severing means is deployed in the cutting position when in the normal operating mode, said severing means being retracted to the guarded position by control means responsive to operator or logic means inputs.

20. The apparatus of claim 17 further including tree sensing means for entering tree position into the logic means.

21. The apparatus of claim 20 including means to transmit a signal to the operator indicating the need for entry of a take/leave decision.

22. The apparatus of claim 1 including logic means for controlling the position of the tree severing means, said logic means receiving inputs of:
   a. an operator-entered tree grade for a subject tree; and
   b. a time base operating between the time when the tree grade is entered and the operating mechanism would encounter the subject tree;
said logic further containing an algorithm whereby optimum tree spacing would be calculated and the decision whether to take or leave a tree would not be required of the operator.

23. The apparatus of claim 22 further including tree sensing means for entering tree position into the logic means.

24. The apparatus of claim 23 in which a signal is transmitted to the operator when a tree is contacted thus indicating the need for a grade entry into the log system.

25. The apparatus of claims 22, 23, or 24 where the logic means is adapted to process a tree grade entered on an ordinal scale.

26. The apparatus of claims 17, 20, 21, 22, 23 or 24 further containing a logic override mechanism.

27. The apparatus of claim 20, 21, 23, 24 or 25 where the sensing means is biased so as to respond only to a tree of a given minimum diameter.

28. The apparatus of claim 1 in which the severing means translates forward from a guarded to a cutting position.

29. The apparatus of claim 28 in which the deploying means is a hydraulic cylinder.

30. The apparatus of claim 1 in which the severing means pivots forward on a secondary arm from a guarded to a cutting position.

31. The apparatus of claim 30 in which the deploying means is a hydraulic cylinder.

32. The apparatus of claim 1 in which a locking means acts to rigidize the arm against rearward deflection when the severing means encounters a tree to be severed, said lockings means being responsive to a signal from the deploying means which advances the severing means.

33. Apparatus for selectively cutting trees on tree plantations, said apparatus being propelled by a prime mover and comprising:
a. a rigid frame supporting an operating assembly which further comprises;
b. a moveable primary arm pivotally mounted to the frame, said arm including;
  (1) positioning means mounted between the frame and the primary arm for movement of the primary arm from an idling position relatively nearer the longitudinal axis of the prime mover to an operating position relatively outboard of the longitudinal axis,
  (2) means exerting a biasing force on the primary arm while in the operating position; and
  (3) guide means mounted at the distal end of the primary arm to direct the primary arm past trees selected to remain standing by causing the primary arm to pivot back toward the idling position against the biasing means when such trees are contacted during forward movement of the prime mover; and
c. a secondary arm pivotally mounted near the distal end of the primary arm and including;
  (1) a tree severing means mounted at the distal end of said secondary arm; and
  (2) deploying means operating between the secondary arm and the primary arm, said deploying means serving to advance the secondary arm from a neutral position where said severing means is guarded by the guide means, to a cutting position where said secondary arm and severing means are forward of the primary arm and the severing means is exposed to sever trees selected for removal.

34. The apparatus of claim 33 where the guide means is a tired wheel rotatably mounted in the distal end of the primary arm.

35. The apparatus of claim 33 when the severing means is a circular saw.

36. The apparatus of claim 33 where the severing means is a chainsaw.

37. The apparatus of claims 35 or 36 further including motor drive means for said saws.

38. The apparatus of claims 33 or 34 where the severing means is a hydraulically operated shear.

39. The apparatus of claims 33 or 34 where the severing means is a fixed blade.

40. The apparatus of claim 33 where the secondary arm and severing means are mounted above the guide means.

41. The apparatus of claim 33 where the secondary arm and severing means are mounted below the guide means.

42. The apparatus of claim 41 further including additional guarding means for the severing means, said additional guarding means being located below the severing means and depending from the primary arm.

43. The apparatus of claims 33 or 34 wherein the frame is attached to the prime mover by a three-point hitch.

44. The apparatus of claims 33 or 34 wherein the frame is attached to the prime mover by a semi-hitch and the frame is further supported by a wheel or wheels.

45. The apparatus of claims 33 or 34 wherein the frame is towed by the prime mover and the frame is further supported by a plurality of wheels.

46. The apparatus of claim 33 wherein a second operating assembly is mounted in mirror relationship to the first for achieving simultaneous selective cutting on two rows of trees.

47. The apparatus of claim 33 wherein the secondary arm is moved to a severing position by operator control.

48. The apparatus of claim 33 including logic means for controlling the position of the secondary arm and tree severing means, said logic means receiving inputs of:
a. an operator-entered take/leave decision relative to a subject tree; and
b. a time base operating between the time at which such take/leave decision was entered and the time at which said operating mechanism would encounter the subject tree so that the severing means is exposed for a take decision when the subject tree is encountered and guarded when a leave decision has been made.

49. The apparatus of claim 48 further including tree sensing means for entering tree position into the logic means.

50. The apparatus of claim 49 including means to transmit a signal to the operator indicating the need for entry of a take/leave decision.

51. The apparatus of claim 33 including logic means for controlling the position of the secondary arm and tree severing means, said logic means receiving inputs of:
a. an operator-entered tree grade for a subject tree; and
b. a time base operating between the time when the tree grade is entered and the operating mechanism would encounter the subject tree;
said logic further containing an algorithm whereby optimum tree spacing would be calculated and the decision whether to take or leave a tree would not be required of the operator.

52. The apparatus of claim 51 further including tree sensing means for entering tree position into the logic means.

53. The apparatus of claim 52 in which a signal is transmitted to the operator when a tree is contacted thus indicating the need for a grade entry into the log system.

54. The apparatus of claims 51, 52 or 53 where the logic means is adapted to process a tree grade entered on an ordinal scale.

55. The apparatus of claims 48, 49, 50, 51, 52 or 53 further containing a logic override mechanism.

56. The apparatus of claims 49, 50, 52, 53 or 54 where the sensing means is biased so as to respond only to a tree of a given minimum diameter.

57. The apparatus of claim 33 in which a locking means acts to rigidize the primary means against rearward deflection when the secondary arm is deployed forward and the severing means encounters a tree to be severed, said locking means being responsive to a signal from the deploying means advancing the secondary arm.

58. The apparatus of claims 47 or 48 in which the severing means is guarded by the guide means when in the normal operating mode, said severing means being deployed to the cutting position by control means responsive to operator or logic means inputs.

59. The apparatus of claims 47 or 48 in which the severing means is deployed in the cutting position when in the normal operating mode, said severing means being retracted to the guarded position by control means responsive to operator or logic means inputs.

* * * * *

UNITED STATES PATENT AND TRADEMARK OFFICE
CERTIFICATE OF CORRECTION

PATENT NO. : 4,326,570
DATED : April 27, 1982
INVENTOR(S) : Robert B. Fridley and Raymond L. Moser It is certified that error appears in the above—identified patent and that said Letters Patent is hereby corrected as shown below:

In column 10, lines 65-66 "in which a signal is transmitted" should read --including means to transmit a signal--

In column 10, line 67 "log" should read --logic--

Signed and Sealed this

Twenty-seventh Day of September 1983

[SEAL]

Attest:

GERALD J. MOSSINGHOFF

Attesting Officer      Commissioner of Patents and Trademarks